W. KIELING.
CRANK SHAFT CONNECTION.
APPLICATION FILED FEB. 9, 1914.
1,159,231.  Patented Nov. 2, 1915.
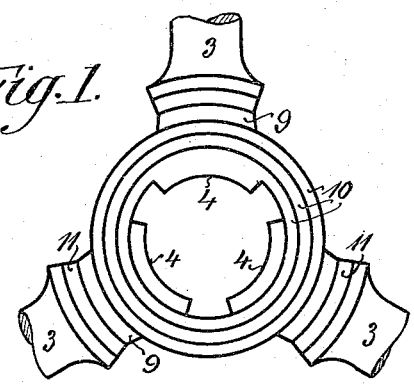
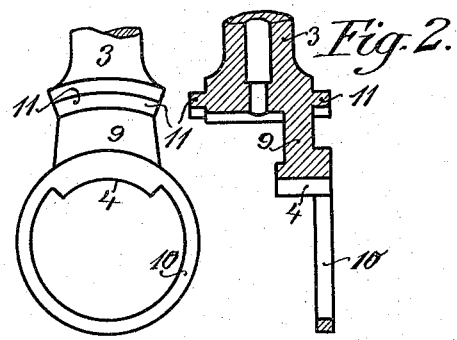
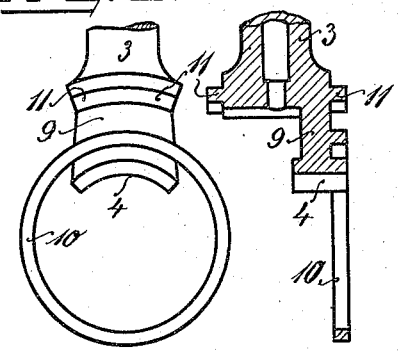
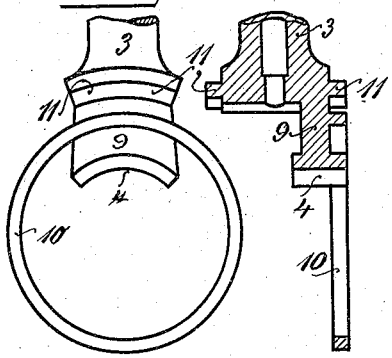
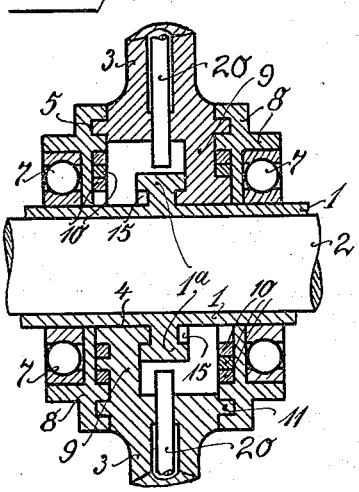
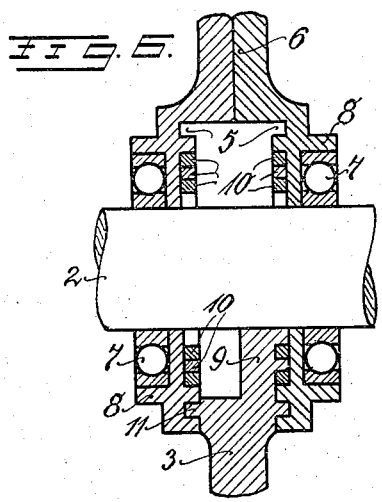
WITNESSES
INVENTOR
WILHELM KIELING
ATTORNEY

UNITED STATES PATENT OFFICE.

WILHELM KIELING, OF FRANKFORT-ON-THE-MAIN, GERMANY.

CRANK-SHAFT CONNECTION.

1,159,231.   Specification of Letters Patent.   Patented Nov. 2, 1915.

Application filed February 9, 1914. Serial No. 817,682.

*To all whom it may concern:*

Be it known that I, WILHELM KIELING, a subject of the German Emperor, residing at Frankfort-on-the-Main, Germany, have invented a new and useful Improvement in Crank-Shaft Connections; and I do hereby declare the following to be a full, clear, and exact description of the same.

The invention relates to internal combustion engines with rotating cylinders and especially to improvements in the connecting rod ends of the said engines.

The object of the invention is to provide a connecting rod which is centrally guided on the crank shaft and by which the pressure of explosion is directly transmitted to and taken up by the crank shaft in such a way as to release the centralizing parts of the connecting rod from the said pressure.

In the accompanying drawing, Figure 1 is a side view of three connecting rod ends forming one group; Figs. 2, 3 and 4 show in side view and in section the separate connecting rod ends forming one group; Fig. 5 is a section through the connecting rod ends arranged on the crank shaft; and Fig. 6 is a section according to Fig. 5 and shows a modified form of execution of the connecting rod ends.

As shown in Fig. 5 the crank shaft 2 of any known construction and forming part of any known type of internal combustion engines with rotating cylinders carries a sleeve 1 having cams 1ª adapted to control the movement of the inlet valves (not shown) by the intermediary of spindles 20 arranged in the connecting rods 3, from which only the ends are illustrated. The sleeve 1 is rotated in any convenient manner.

If the engine has seven cylinders, as is assumed in the case illustrated, the connecting rods are preferably divided into two groups of three each and a main connecting rod 6. The latter is divided longitudinally and each half is connected with a bush 8 (Fig. 5) adapted to be engaged by ball bearings 7 and by the ends of the connecting rods 3 forming a group.

The connecting rod ends have enlargements 9 arranged in axial direction of the rods 3 and provided with enlarged bearing faces 4 contacting with the crank shaft 2 or the sleeve 1, and the said enlargements 9 are formed integral with rings 10 of different diameter adapted to be concentrically arranged one within another, as is shown in Fig. 1. The connecting rod ends, furthermore, are provided with lateral projections 11 arranged diametrically opposite one another, while the bushes 8 are provided with annular grooves 5 in which the said projections may be inserted.

In assembling the connecting rod ends of each group the smaller rings 10 are inserted in the larger ones so that the three rings of each group are arranged concentrically one within another (Fig. 1). The groups of three connecting rods are then inserted with their ends in the bushes 8 of the halves of the main connecting rod 6, whereby the projections 11 on the side of the connecting rod ends which is provided with the rings 10 engage the groove 5 of the bushes. The halves of the main connecting rod 6 and therewith the bushes 8 are then fastened together by any convenient means. The projections 11 arranged on the side of the connecting rod ends opposite to the rings 10 within a bush 8 engage in the groove 5 of the other bush 8 in which the second group of connecting rod ends is inserted, and vice versa, as is shown in Figs. 5 and 6. To further enlarge the bearing faces 4 which take up the axial pressure of the rod 3, the cam 1ª may be undercut as is shown at 15 (Fig. 5).

Fig. 6 shows a construction with which the spindles 20 for the control of the inlet valves are not arranged in the connecting rods or are dispensed with as is the case with the known type of engines having but one valve. In this modified form of execution the sleeve 1 and the cam 1ª are not arranged on the crank shaft 2 to which the faces 4 of the enlargements 9 of the connecting rods 3 directly contact.

What I claim is:

1. In combination, a shaft, rods arranged thereon and having enlargements adapted to engage said shaft, rings formed integrally with the said enlargements and adapted to fit concentrically one over another, a main rod, and bushes thereon adapted to be engaged by the said rings.

2. In combination, a shaft, rods arranged thereon and having enlarged ends, rings on said ends and adapted to be assembled in two groups, a two part main rod, and bushes integral with the parts of the main rod and adapted to be engaged by the said group of rings.

3. In combination, a shaft, rods arranged thereon and having enlarged ends, rings on the enlarged ends adapted to be concentrically arranged in two groups, a two part main rod, bushes on said parts and provided with annular grooves, and lateral projections on the said enlarged ends and adapted to engage the said grooves.

4. In combination, a shaft, rods arranged thereon and having enlarged ends, rings on said ends adapted to be concentrically assembled in two groups, a two part main rod, bushes on said parts and adapted to be engaged by the said ring groups, said bushes being provided with annular grooves, and lateral projections on said enlarged ends and adapted to engage the said grooves.

In testimony whereof, I have signed my name to this specification in the presence of two subscribing witnesses.

WILHELM KIELING.

Witnesses:
JEAN GRUND,
CARL GRUND.

Copies of this patent may be obtained for five cents each, by addressing the "Commissioner of Patents, Washington, D. C."